United States Patent
Ooshima et al.

(10) Patent No.: US 10,995,853 B2
(45) Date of Patent: May 4, 2021

(54) VEHICLE CONTROL DEVICE

(71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/613,095

(22) PCT Filed: May 10, 2018

(86) PCT No.: PCT/JP2018/018049
§ 371 (c)(1),
(2) Date: Nov. 12, 2019

(87) PCT Pub. No.: WO2018/207855
PCT Pub. Date: Nov. 15, 2018

(65) Prior Publication Data
US 2020/0096099 A1    Mar. 26, 2020

(30) Foreign Application Priority Data
May 12, 2017 (JP) .............................. JP2017-095969

(51) Int. Cl.
*F16H 59/66* (2006.01)
*F16H 61/16* (2006.01)
(Continued)

(52) U.S. Cl.
CPC ............ *F16H 61/16* (2013.01); *F16H 61/12* (2013.01); *F16H 59/66* (2013.01); *F16H 59/74* (2013.01);
(Continued)

(58) Field of Classification Search
CPC .... F16H 59/66; F16H 59/70; F16H 2059/663; F16H 2059/666; F16H 61/0213; F16H 2061/022; F16H 2061/0234
See application file for complete search history.

(56) References Cited

U.S. PATENT DOCUMENTS 4,823,646 A  *  4/1989  Yoshimura .......... F16H 61/0213
                                                477/148
5,832,400 A  *  11/1998  Takahashi ......... B60W 30/1819
                                                701/53
(Continued)

FOREIGN PATENT DOCUMENTS

CN         102066812 A      5/2011
CN         104141782 A     11/2014
(Continued)

OTHER PUBLICATIONS

International Search Report and Written Opinion for related International Application No. PCT/JP2018/018049 dated Aug. 7, 2018; English translation of ISR provided (8 pages).
(Continued)

*Primary Examiner* — Edwin A Young
(74) *Attorney, Agent, or Firm* — Procopio, Cory, Hargreaves & Savitch LLP

(57) ABSTRACT

A vehicle control device includes: a travel section determination unit configured to determine a forward travel section that is a travel section having a different road gradient from a current travel section in which a vehicle is currently traveling and that is ahead in a travel direction of the vehicle; a forward gear stage selection unit configured to select a forward gear stage which is a gear stage of the vehicle in the forward travel section; and a shift control unit configured to, in a case where the selected forward gear stage is lower by two or more stages than the current gear stage which is a gear stage of the vehicle in the current travel section and when the vehicle is positioned within a predetermined range from a start position of the forward travel section, perform downshift from the current gear stage to the forward gear stage.

6 Claims, 6 Drawing Sheets

(51) Int. Cl.
*F16H 61/12* (2010.01)
*F16H 59/74* (2006.01)
(52) U.S. Cl.
CPC .... *F16H 2059/663* (2013.01); *F16H 2306/40* (2013.01)

(56) References Cited

U.S. PATENT DOCUMENTS

| | | | |
|---|---|---|---|
| 2002/0013650 A1* | 1/2002 | Kusafuka | F16H 61/0213 701/51 |
| 2014/0336889 A1 | 11/2014 | Tipton et al. | |
| 2015/0330502 A1* | 11/2015 | Johansson | B60W 10/11 701/55 |
| 2018/0051802 A1 | 2/2018 | Ishiguro et al. | |
| 2018/0058574 A1 | 3/2018 | Ishiguro et al. | |
| 2018/0290643 A1* | 10/2018 | Jeon | F16H 61/0213 |

FOREIGN PATENT DOCUMENTS

| | | |
|---|---|---|
| JP | H06-313477 A | 11/1994 |
| JP | 2016183727 A | 10/2016 |
| JP | 2016183728 A | 10/2016 |
| WO | 2009154559 A1 | 12/2009 |

OTHER PUBLICATIONS

CN Office Action for the corresponding Chinese patent application No. 201880030977.4 dated Aug. 17, 2020, English translation of CN OA provided, Total pp. 14.

\* cited by examiner

VEHICLE CONTROL DEVICE

CROSS-REFERENCE TO RELATED APPLICATIONS

This application is a U.S. National Stage entry of PCT Application No: PCT/JP2018/018049 filed on May 10, 2018, which claims priority to Japanese Patent Application No. 2017-095969, filed May 12, 2017, the contents of which are incorporated herein by reference.

TECHNICAL FIELD

The present disclosure relates to a vehicle control device.

BACKGROUND ART

Related art discloses controlling a gear stage of a vehicle depending on a state of a current travel road on which the vehicle is currently travelling. For example, in a case where the current travel road on which the vehicle is currently travelling is an uphill section, the gear stage is automatically downshifted to a gear stage which is lower than a current gear stage of the vehicle (see, for example, Patent Literature 1).

CITATION LIST

Patent Literature

Patent Literature 1: JP-A-H06-313477

SUMMARY OF INVENTION

Technical Problem

However, if downshift is performed while travelling the uphill section, the vehicle temporarily stalls, and there arises a problem that it takes time for recovering the speed.

The present disclosure is made in view of the above circumstances, and an object thereof is to provide a vehicle control device capable of suppressing stall of a vehicle in an uphill section.

Solution to Problem

An aspect of the present disclosure is a vehicle control device. This device includes: a travel section determination unit configured to determine a forward travel section that is a travel section having a different road gradient from a current travel section in which a vehicle is currently traveling and that is ahead in a travel direction of the vehicle; a forward gear stage selection unit configured to select a forward gear stage which is a gear stage of the vehicle in the forward travel section; and a shift control unit configured to, in a case where the selected forward gear stage is lower by two or more stages than a current gear stage which is a gear stage of the vehicle in a current travel state of the vehicle and when the vehicle is positioned within a predetermined range with respect to a start position of the forward travel section, perform downshift from the current gear stage to the forward gear stage.

The shift control unit may be configured to calculate a stall amount of the vehicle from a start point of the forward travel section to an end point of the forward travel section of the vehicle, and to control shift of the gear stage so as to prevent the downshift from the current gear stage to the forward gear stage and to maintain the current gear stage even when the vehicle is positioned within the predetermined range from the start position of the forward travel section in a case where the calculated stall amount is smaller than a predetermined value.

The shift control unit may be configured to perform the downshift from the current gear stage to the selected forward gear stage in the case where the forward gear stage is lower by two or more stages than the current gear stage and when the vehicle is positioned within the predetermined range from the start position to a predetermined position behind the start position.

The shift control unit may be configured to change a timing of performing the downshift from the current gear stage to the forward gear stage based on the road gradient of the forward travel section.

Advantageous Effects of Invention

According to the present disclosure, it is possible to prevent stall of a vehicle in an uphill section.

DESCRIPTION OF EMBODIMENTS

Outline of Vehicle According to an Embodiment

An outline of a vehicle V according to an embodiment will be described with reference to FIG. 1.

Figure 1:
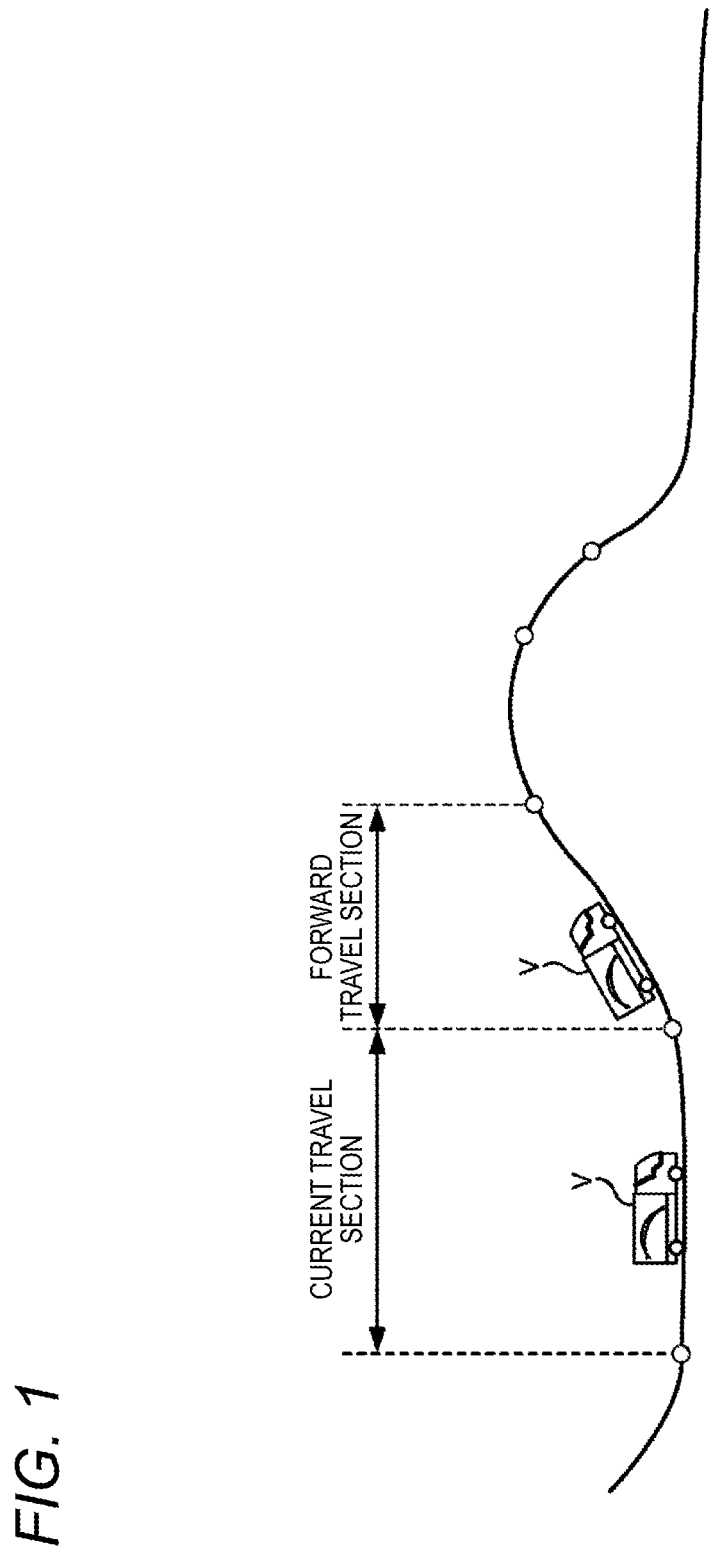
FIG. 1 is a diagram illustrating an outline of a vehicle according to an embodiment.

FIG. 1 is a diagram illustrating the outline of the vehicle V according to the embodiment.

The vehicle V according to the embodiment selects a forward gear stage, which is a gear stage of the vehicle V in a forward travel section ahead in a travel direction of itself. The vehicle V performs downshift from a current gear stage, which is a gear stage of the vehicle in a current travel state, to the selected forward gear stage when the vehicle is positioned within a predetermined range from a start position of the forward travel section in a case where the forward gear stage is lower by two or more stages than the current gear stage. In this way, the vehicle V starts travel in an uphill section in the forward gear stage, and it is possible to prevent stall of the vehicle V in the uphill section. Hereinafter, the vehicle V will be described in detail.

[Vehicle Configuration According to an Embodiment]

A configuration of the vehicle V according to the embodiment will be described with reference to FIG. 2.

Figure 2:
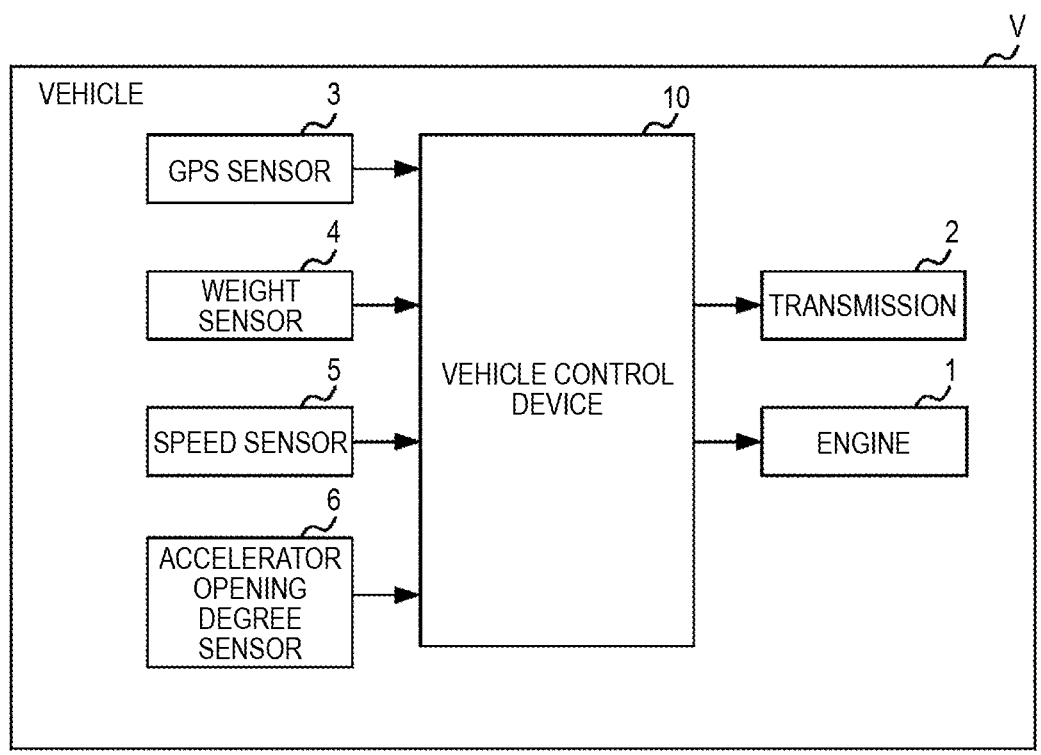
FIG. 2 is a diagram schematically showing an internal configuration of the vehicle according to the embodiment.

FIG. 2 is a diagram schematically showing an internal configuration of the vehicle V according to the embodiment. The vehicle V according to the embodiment includes an engine 1, a transmission 2, a global positioning system (GPS) sensor 3, a weight sensor 4, a speed sensor 5, an accelerator opening degree sensor 6, and the vehicle control device 10.

The vehicle V is a large vehicle that uses the engine 1 such as a diesel engine as a driving force, and is, in particular, a vehicle that is mounted with an automatic cruise mode. The transmission 2 transmits a rotational driving force of the engine 1 to a drive wheel (not shown) of the vehicle V. The transmission 2 includes a plurality of stages of gears for converting the rotational driving force of the engine 1.

Here, the "automatic cruise mode" in the vehicle V refers to a mode in which the engine 1, the transmission 2, and the like are automatically controlled by the vehicle control device 10 so as to maintain the speed of the vehicle V set in advance even if the driver does not operate an accelerator or a shift lever. The automatic cruise mode is mainly assumed to be used when the vehicle V travels on a highway.

The vehicle V travels in either mode of an economy mode as a first mode and a power mode as a second mode. The economy mode is a mode of travel in which suppression of fuel consumption of the vehicle V is prioritized. The power mode is a mode of travel in which improvement of travel performance of the vehicle V is prioritized.

The GPS sensor 3 receives and analyzes radio waves transmitted from a plurality of navigation satellites so as to acquire a position of the GPS sensor 3, that is, a position of the vehicle V on which the GPS sensor 3 is mounted. The GPS sensor 3 outputs information indicating the position of the vehicle V to the vehicle control device 10.

The weight sensor 4 acquires a total weight of the vehicle V. Specifically, the weight sensor 4 measures a weight of load on the vehicle V, and sums the weight with a weight of the vehicle V alone excluding the load so as to acquire the total weight of the vehicle V. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10. The accelerator opening degree sensor 6 measures an accelerator opening degree which is a depression amount of an accelerator pedal by the driver of the vehicle V. The accelerator opening degree sensor 6 outputs information indicating the accelerator opening degree to the vehicle control device 10.

The vehicle control device 10 acquires the information from the sensors described above, and controls an amount of fuel to be supplied to a cylinder in the engine 1 and the gear stage of the transmission 2 based on the acquired information. In a case where the vehicle V is in the automatic cruise mode, the vehicle control device 10 controls the engine 1 and the transmission 2 so that the vehicle V travels while maintaining the set speed. In a case where a speed limit device (SLD) of the vehicle V is operating, the vehicle control device 10 controls the engine 1 and the transmission 2 so that the speed of the vehicle V does not exceed a set upper limit speed.

In a case where the vehicle V is the economy mode, the vehicle control device 10 controls the engine 1 and the transmission 2 while prioritizing a lower fuel consumption. In a case where the vehicle V is the power mode, the vehicle control device 10 controls the engine 1 and the transmission 2 while prioritizing a higher travel performance.

[Configuration of Vehicle Control Device 10 According to an Embodiment]

Next, a configuration of the vehicle control device 10 according to an embodiment will be described with reference to FIG. 3.

Figure 3:
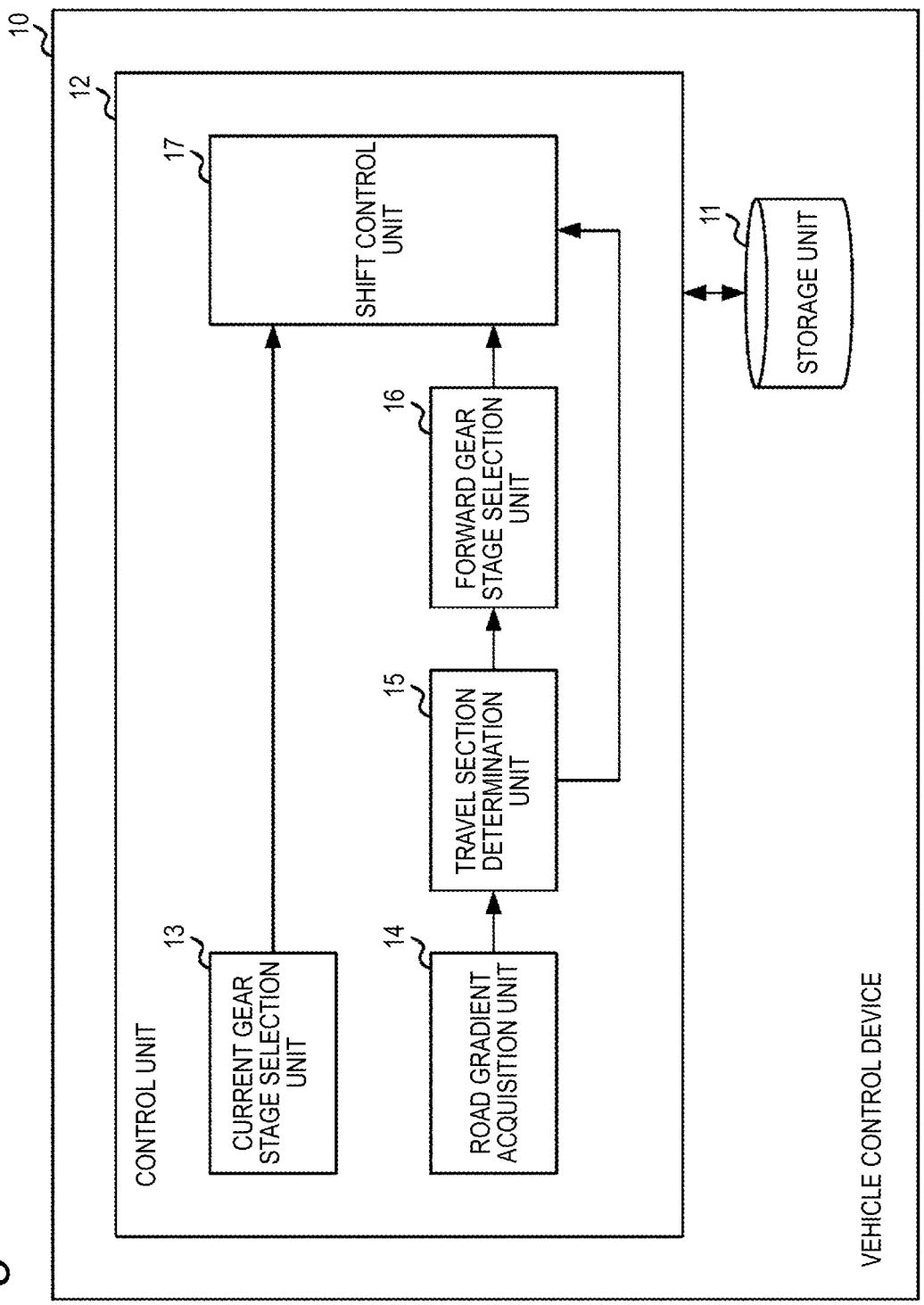
FIG. 3 is a diagram illustrating a configuration of a vehicle control device according to the embodiment.

FIG. 3 is a diagram illustrating the configuration of the vehicle control device 10 according to the embodiment. The vehicle control device 10 according to the embodiment includes a storage unit 11 and a control unit 12.

The storage unit 11 is, for example, a read only memory (ROM) or a random access memory (RAM). The storage unit 11 stores various programs for causing the control unit 12 to function.

The control unit 12 is a calculation resource including a processor such as a central processing unit (CPU) (not shown). The control unit 12 implements functions of a current gear stage selection unit 13, a road gradient acquisition unit 14, a travel section determination unit 15, a forward gear stage selection unit 16, and a shift control unit 17 by executing programs stored in the storage unit 11.

The current gear stage selection unit 13 calculates a net average effective pressure PmeR of the engine 1 corresponding to a travel resistance of the vehicle V in the current travel state every predetermined time, and calculates a net average effective pressure Pme of each gear stage based on the calculated net average effective pressure PmeR. The net average effective pressure Pme of each gear stage is a minimum torque required for maintaining the current travel state. The current gear stage selection unit 13 selects the current gear stage, which is a gear stage of the transmission 2 in the current travel state of the vehicle V, by using the calculated net average effective pressure Pine of each gear stage and an engine rotational speed in a case of shifting to each gear stage, and by referring to an iso-fuel consumption map and a maximum torque map PmeMAX.

Specifically, first, the current gear stage selection unit 13 calculates the net average effective pressure PmeR of the engine 1 corresponding to the travel resistance in the current travel state. The current gear stage selection unit 13 calculates the net average effective pressure Pme of the engine 1 from a torque generated by the engine 1. The current gear stage selection unit 13 calculates the net average effective pressure PmeR corresponding to the travel resistance of the engine 1 from the calculated net average effective pressure Pine, a vehicle weight, a gear ratio of the gear stage selected by the transmission 2, a final deceleration ratio, a transmission efficiency, an engine exhaust amount, a wheel radius, and an acceleration of the vehicle V. The current gear stage selection unit 13 calculates in each gear stage the net average effective pressure Pme, which is the minimum torque required for maintaining the current travel state, and the engine rotational speed, based on the calculated net average effective pressure PmeR, and creates an iso-horsepower diagram. The current gear stage selection unit 13 selects a gear stage having the best fuel efficiency by referring to the iso-horsepower diagram, the maximum torque map PmeMAX, and the iso-fuel consumption map. The current gear stage selection unit 13 may calculate the net average effective pressure PmeR corresponding to the travel resistance based on a road gradient on the road on which the vehicle V is currently traveling, which is acquired by the road gradient acquisition unit 14.

Based on the information indicating the position of the vehicle V acquired from the GPS sensor 3 and map information stored in the storage unit 11, the road gradient acquisition unit 14 acquires the mad gradient on the road on which the vehicle V is currently traveling. For example, the road gradient acquisition unit 14 acquires the road gradient from the position of the vehicle V to a position ahead by a predetermined distance (for example, 500 m).

The travel section determination unit 15 determines a forward travel section that is ahead in the travel direction of the vehicle V and that is a travel section having a different road gradient from a current travel section in which the vehicle is currently traveling based on the road gradient acquired by the road gradient acquisition unit 14.

The forward gear stage selection unit 16 selects the forward gear stage, which is a gear stage of the transmission 2 in the forward travel section, based on the road gradient of the forward travel section. Specifically, first, the forward gear stage selection section 16 calculates the travel resistance of the forward travel section based on a rolling resistance of the drive wheel of the vehicle V, an air resistance of the vehicle V, and a gradient resistance of the forward travel section.

Subsequently, the forward gear stage selection unit 16 specifies the forward gear stage based on driving force characteristic information indicating the relationship between the speed and the driving force of the vehicle V of each of the plurality of gear stages of the vehicle V stored in the storage unit 11 and the calculated travel resistance of the forward travel section.

Figure 4:
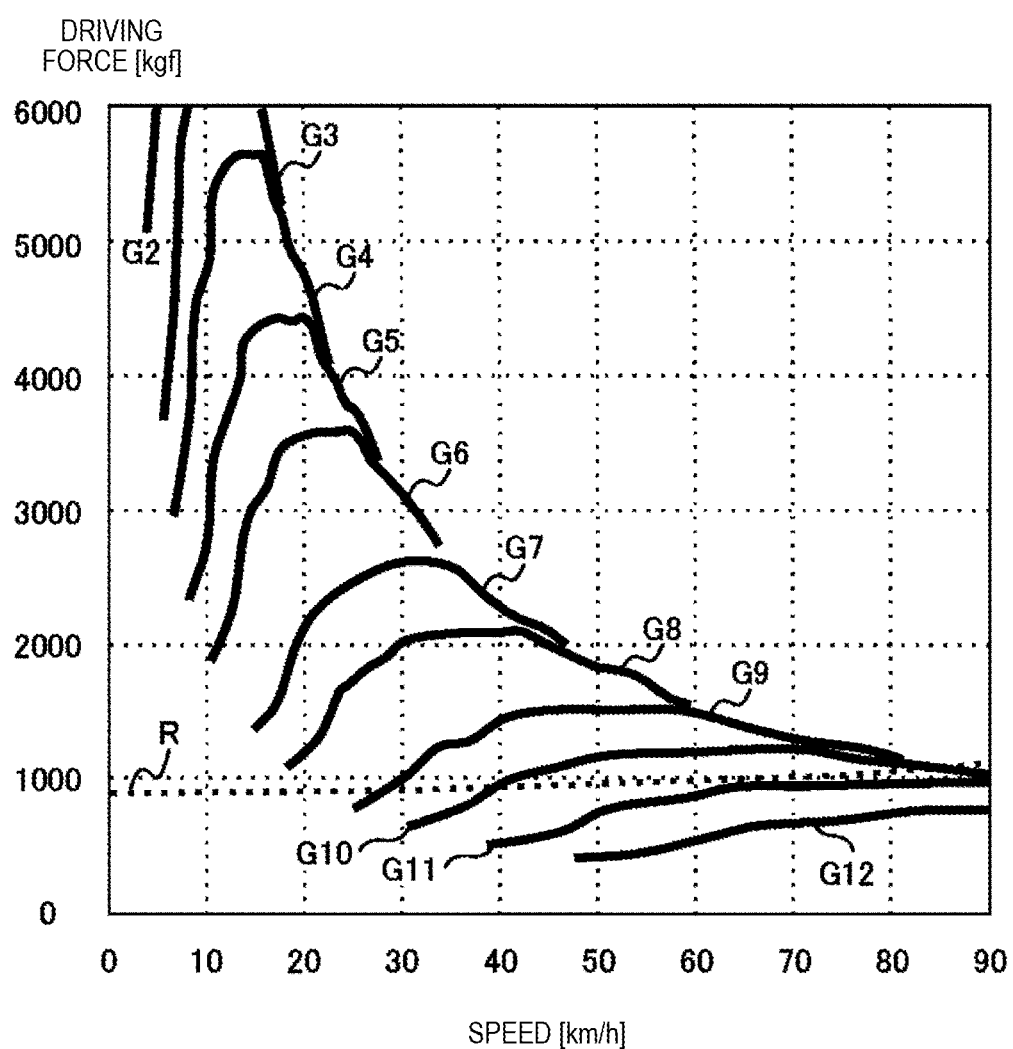
FIG. 4 is a travel performance diagram of the vehicle according to the embodiment.
Figure 5:
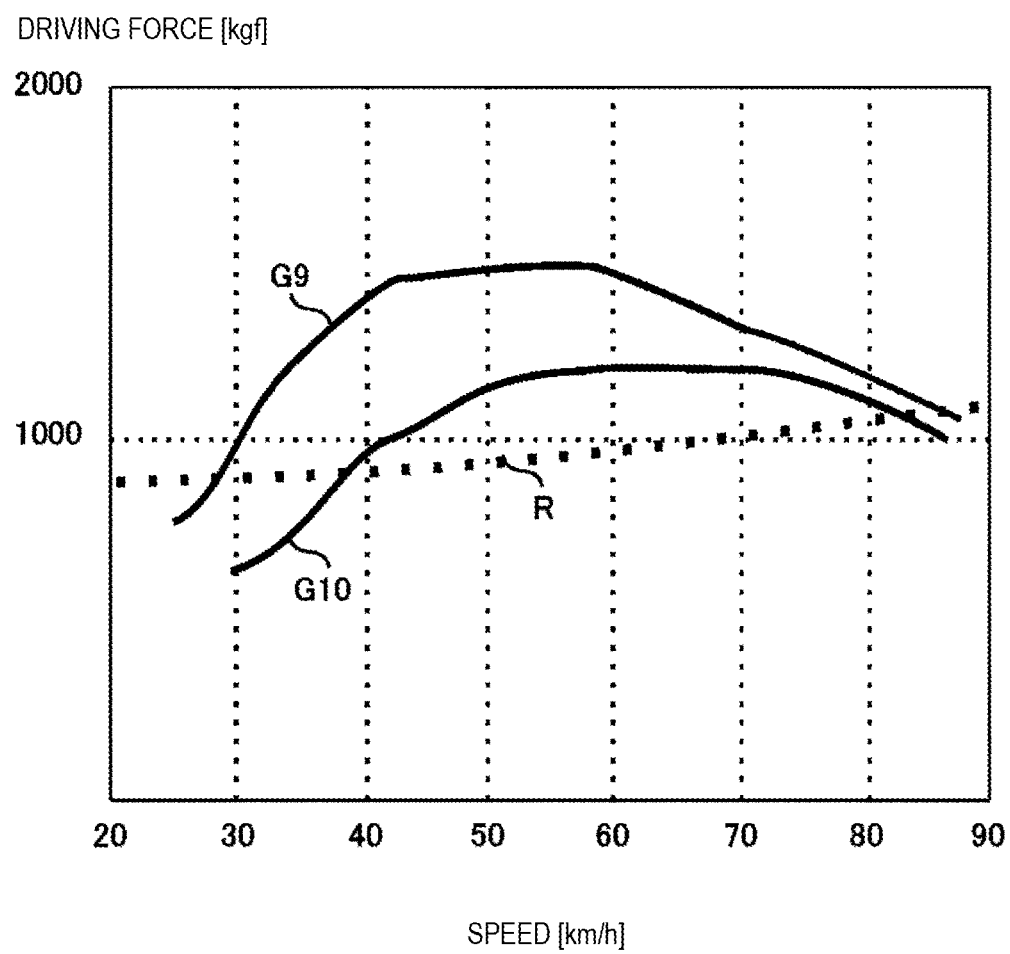
FIG. 5 is a diagram illustrating a part of the travel performance diagram shown in FIG. 4.

FIG. 4 is a travel performance diagram of the vehicle V corresponding to the driving force characteristic information according to the embodiment. FIG. 4 shows driving force characteristics G2 to G12 indicating the relationship between the driving force of the vehicle V and the speed in each of second to twelfth stages as the plurality of gear stages. FIG. 4 furthers shows a travel resistance characteristic R indicating the relationship between the speed of the vehicle V and the travel resistance corresponding to the forward travel section. FIG. 5 is a diagram illustrating a part of the travel performance diagram shown in FIG. 4. FIG. 5 shows the ninth and tenth driving force characteristics G9 and 010 and the travel resistance characteristic R corresponding to the forward travel section.

The forward gear stage selection unit 16 selects a gear stage in which the driving force of the vehicle V becomes greater than the travel resistance of the vehicle V in the forward traveling section as the forward gear stage, based on the driving force characteristics respectively corresponding to the plurality of gear stages.

The forward gear stage selection unit 16 selects the gear stages in different manners in cases where the travel mode of the vehicle V is the economy mode and the power mode. First, a selection example of the gear stage in the case of the economy mode will be described.

In the case where the travel mode of the vehicle V is the economy mode, for each of the plurality of gear stages at which the vehicle can travel in the forward travel section, the forward gear stage selection unit 16 specifies a minimum travelable vehicle speed, which is a minimum speed among the speed at which the vehicle V can travel.

Specifically, for the driving force characteristic of each of the plurality of gear stages, the forward gear stage selection unit 16 specifies a minimum speed among the speed of the vehicle V, at which the driving force indicated by the driving force characteristic is equal to or greater than the travel resistance indicated by the travel resistance characteristic corresponding to the forward travel section, as the minimum travelable vehicle speed. The forward gear stage selection unit 16 specifies a lowest speed among the speed, at which the driving force indicated by the driving force characteristic and the travel resistance indicated by the travel resistance characteristic coincide with each other, as the minimum travelable vehicle speed. In a case where the driving force exceeds the travel resistance at each speed and thus the driving force and the traveling resistance do not coincide with each other, the forward gear stage selection unit 16 specifies a minimum speed of the vehicle V indicated by the driving force characteristic as the minimum travelable vehicle speed. In the example shown in FIG. 5, for the eighth stage, the forward gear stage selection unit 16 specifies the minimum travelable vehicle speed as 18 km/h.

The forward gear stage selection unit 16 selects as the forward gear stage a gear stage at which the minimum travelable vehicle speed is highest and the driving force characteristic is low (a highest travelable gear stage) among the plurality of gear stages. Thereby, the forward gear stage selection unit 16 can select the highest travelable gear stage in the economy mode.

For example, the forward gear stage selection unit 16 selects the tenth and lower stages as a gear stage at which the vehicle can travel in the forward traveling section. For the ninth stage, the forward gear stage selection unit 16 specifies a low speed among the speed of the vehicle V, at which the driving force indicated by the driving force characteristic and the travel characteristic indicated by the travel resistance characteristic R corresponding to the forward travel section coincide with each other, as the minimum travelable vehicle speed. In the example shown in FIG. 5, the forward gear stage selection unit 16 specifies the minimum travelable vehicle speed as 28 km/h. Similarly, for the tenth stage, the forward gear stage selection unit 16 specifies the minimum travelable vehicle speed as 40 km/h. The forward gear stage selection unit 16 selects a gear stage having a highest speed among the minimum travelable vehicle speed specified for the gear stages of the tenth and lower stages and a low driving force characteristic, that is, the tenth stage, as the forward gear stage.

In the case where the travel mode of the vehicle V is the power mode, for each of the plurality of gear stages at which the vehicle can travel in the forward travel section, the forward gear stage selection unit 16 specifies a maximum travelable vehicle speed, which is a maximum speed among the speed at which the vehicle V can travel.

Specifically, in the case of power mode, for the driving force characteristic of each of the plurality of gear stages, the forward gear stage selection unit 16 specifies a maximum speed among the speed of the vehicle V, at which the driving force indicated by the driving force characteristic is equal to or greater than the travel characteristic indicated by the travel resistance characteristic corresponding to the forward travel section, as the maximum travelable vehicle speed. The forward gear stage selection unit 16 specifies a highest speed among the speed, at which the driving force indicated by the driving force characteristic and the travel resistance indicated by the travel resistance characteristic coincide with each other, as the maximum travelable vehicle speed. In a case where the driving force exceeds the travel resistance at each speed and thus the driving force and the traveling resistance do not coincide with each other, the forward gear stage selection unit 16 specifies a maximum speed of the vehicle V indicated by the driving force characteristic as the maximum travelable vehicle speed. For example, for the eighth stage, the forward gear stage selection unit 16 specifies the maximum travelable vehicle speed as 59 km/h.

The forward gear stage selection unit 16 selects as the forward gear stage a gear stage at which the maximum travelable vehicle speed is highest and the driving force characteristic is high (a highest-speed travelable gear stage) among the plurality of gear stages. Thereby, the forward gear stage selection unit 16 can select the highest-speed travelable gear stage in the power mode.

For example, the forward gear stage selection unit 16 selects the tenth and lower stages as a travelable gear stage.

For the ninth stage, the forward gear stage selection unit 16 specifies a lowest speed among the speed of the vehicle V, at which the driving force indicated by the driving force characteristic and the travel characteristic indicated by the travel resistance characteristic R corresponding to the forward travel section coincide with each other, as the maximum travelable vehicle speed. In the example shown in FIG. 5, the forward gear stage selection unit 16 specifies the maximum travelable vehicle speed as 87 km/h. Similarly, for the tenth stage, the forward gear stage selection unit 16 specifies the maximum travelable vehicle speed as 82 km/h. The forward gear stage selection unit 16 selects a gear stage having a highest speed among the maximum travelable vehicle speed specified for the gear stages including the tenth and lower stages and a high driving force characteristic, that is, the ninth stage, as the forward gear stage.

The shift control unit 17 calculates the speed at the time of entering the forward travel section and the travel resistance of the vehicle V in the forward travel section. In order to calculate the speed at the time of entering the forward traveling section, the shift control unit 17 specifies the driving force of the vehicle V at the current speed by referring to the driving force characteristic information of the vehicle V stored in the storage unit 11. Further, the shift control unit 17 calculates the travel resistance at the current speed in the current travel section. The shift control unit 17 calculates the acceleration of the vehicle V based on a difference between the specified driving force and the traveling resistance and the total weight of the vehicle V acquired by the weight sensor 4. Here, in a case where the travel resistance exceeds the driving force of the vehicle V, the acceleration of the vehicle V becomes a negative value. The shift control unit 17 calculates a change amount of the speed of the vehicle V from the current position of the vehicle V to the start position of the forward travel section based on the calculated acceleration of the vehicle V and a remaining distance of the current travel section. Here, it is assumed that the stall amount is calculated as the change amount of the speed of the vehicle V. The shift control unit 17 subtracts the stall amount from the current speed of the vehicle V to calculate the speed of the vehicle V at the time of entering the forward travel section.

The shift control unit 17 estimates the travel resistance of the vehicle V in the forward travel section based on the road gradient in the forward travel section. The shift control unit 17 calculates the travel resistance characteristic of the forward travel section based on the rolling resistance of the drive wheel of the vehicle V, the air resistance of the vehicle V, and the gradient resistance of the forward travel section.

[Shift Control Based on Current Gear Stage Selected by Current Gear Stage Selection Unit 13]

The shift control unit 17 controls shift of the gear stage of the vehicle V in the current travel section based on the current gear stage selected by the current gear stage selection unit 13. For example, in a case where the current gear stage selection unit 13 newly selects a target gear stage that is different from the current gear stage while the vehicle V is traveling in the current travel section at the current gear stage, the shift control unit 17 controls shift of the gear stage of the transmission 2 such that the current gear stage is shifted to the target gear position.

[Shift Control Based on Forward Gear Stage Selected by Forward Gear Stage Selection Unit 16]

When the vehicle V is positioned within a predetermined range from the start position of the forward travel section, the shift control unit 17 controls shift of the gear stage of the vehicle V based on the current gear stage and the forward gear stage that is selected by the forward gear stage selection section 16.

Specifically the shift control unit 17 performs downshift from the current gear stage, which is the gear stage of the vehicle V in the current travel section, to the selected forward gear stage when the vehicle V is positioned within the predetermined range with respect to the start position of the forward travel section in the case where the forward gear stage is lower by two or more stages than the current gear stage.

More specifically, the shift control unit 17 performs downshift from the current gear stage to the selected forward gear stage in the case where the forward gear stage is lower by two or more stages than the current gear stage and when the vehicle V is positioned within the predetermined range from the start position of the forward travel section to a predetermined position behind the start position. Here, the predetermined range is, for example, 100 meters. The shift control unit 17 may perform downshift from the current gear stage to the selected forward gear stage in response to the vehicle V being positioned at the start position of the forward travel section in the case where the forward gear stage is lower by two or more stages than the current gear stage.

Here, the shift control unit 17 may change the timing of performing downshift from the current gear stage to the forward gear stage by changing the predetermined range based on the road gradient of the forward travel section. For example, in a case where the road gradient of the forward travel section is large, the shift control unit 17 may elongate the predetermined range as compared with a case where the road gradient of the forward travel section is small. In this way, since the vehicle control device 10 can set a high driving force of the vehicle V at the time of entering the forward traveling section, it is possible to further prevent stall of the vehicle V in the uphill section.

The shift control unit 17 calculates the stall amount of the vehicle V from an end point of the current travel section of the vehicle V, that is, a start point of the forward travel section, to an end point of the forward travel section. Here, the shift control unit 17 calculates the speed of the vehicle V at the end point of the current travel section based on an acceleration amount or the stall amount of the vehicle V in a case where the vehicle V travels in the current travel section. Further, the shift control unit 17 calculates the stall amount of the vehicle V in a case where the vehicle V travels in the forward travel section based on the speed at the end point of the current travel section, that is, at the time of entering the forward travel section of the vehicle V.

The shift control unit 17 controls shift of the gear stage so as to prevent a downshift from the current gear stage to the forward gear stage and to maintain the current gear stage even when the vehicle is positioned within the predetermined range from the start position of the forward travel section in a case where the calculated stall amount is smaller than a predetermined value. The predetermined value is, for example, 10% of the current speed of the vehicle V.

In this way, the vehicle control device 10 can achieve a stall amount of the vehicle V smaller than the predetermined value while traveling in the forward travel section, and thus can suppress the fuel consumption without giving a sense of discomfort to the driver.

[Processing Flow of Shift Control Based on Forward Gear Stage]

Figure 6:
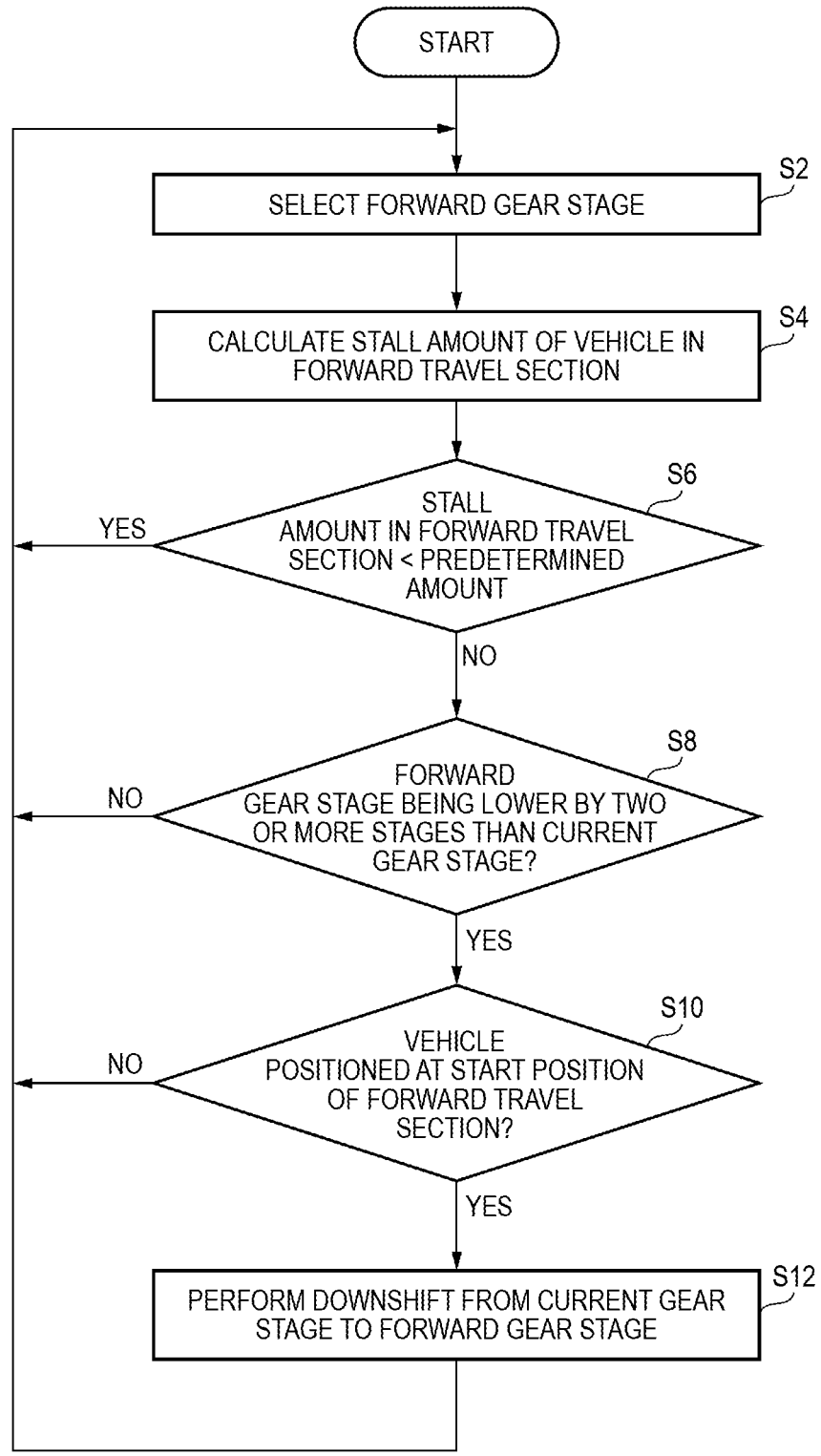
FIG. 6 is a flowchart for explaining a flow of a processing related to shift control based on a forward gear stage that is executed by the vehicle control device according to the embodiment.

Next, a processing flow of shift control based on the forward gear stage according to an embodiment will be described. FIG. 6 is a flowchart for explaining a flow of the processing related to shift control based on the forward gear stage that is executed by the vehicle control device 10 according to the embodiment. The processing of this flowchart is assumed to be started in response to start of travel of the vehicle V. The processing of this flowchart is assumed to be performed continuously while the vehicle V is traveling.

The forward gear stage selection unit 16 selects the forward gear stage (S2). The shift control unit 17 calculates the stall amount of the vehicle V in the forward travel section (S4).

The shift control unit 17 determines whether or not the stall amount of the vehicle V in the forward travel section is lower than a predetermined amount (S6). If lower than the predetermined amount (YES in S6), the shift control unit 17 proceeds to S2.

If equal to or greater than the predetermined amount (NO in S6), the shift control unit 17 determines whether or not the forward gear stage selected by the forward gear stage selection unit 16 is lower by two or more stages than the current gear stage (S8). If one or less stages (NO in S8), the shift control unit 17 proceeds to S2. If lower by two or more stages (YES in S8), the shift control unit 17 determines whether or not the vehicle V is positioned at the start position of the forward travel section (S10). If the vehicle V is not positioned at the start position of the forward travel section (NO in S10), the shift control unit 17 proceeds to S2.

In a case where the vehicle V is positioned at the start position of the forward travel section (YES in S10), the shift control unit 17 performs downshift from the current gear stage to the forward gear stage (S12).

Effects of the Present Embodiment

As described above, the vehicle control device 10 according to the present embodiment is configured to, in the case where the forward gear stage which is the gear stage of the vehicle in the forward travel section is lower by two or more stages than the current gear stage which is the gear stage of the vehicle in the current travel section and when the vehicle is positioned within the predetermined range from the start position of the forward travel section, perform downshift from the current gear stage to the forward gear stage. In this way, the vehicle control device 10 starts travelling in an uphill section in the forward gear stage, and it is possible to prevent stall of the vehicle V in the uphill section.

Although the present disclosure has been described using embodiments, the technical scope of the present disclosure is not limited to the scope described in the above embodiment, and various modifications and changes can be made without departing from the scope thereof. For example, a specific embodiment of distributing and integrating devices is not limited to the above embodiment, and all or a part thereof may be configured to be functionally or physically distributed and integrated in arbitrary units. New embodiments generated from any combination of a plurality of embodiments are also included in embodiments of the present disclosure. Effects of the new embodiments generated from the combinations include effects of the original embodiments.

The present application is based on Japanese Patent Application No. 2017-095969 filed on May 12, 2017, contents of which are incorporated herein as reference.

INDUSTRIAL APPLICABILITY

The vehicle control device of the present disclosure is useful in being capable of preventing stall of a vehicle in an uphill section.

REFERENCE SIGNS LIST

1 Engine
2 Transmission
3 GPS sensor
4 Weight sensor
5 Speed sensor
6 Accelerator opening degree sensor
10 Vehicle control device
11 Storage unit
12 Control unit
13 Current gear stage selection unit
14 Road gradient acquisition unit
15 Travel section determination unit
16 Forward gear stage selection unit
17 Shift control unit
V Vehicle

The invention claimed is:
1. A vehicle control device comprising:
a memory that stores instructions; and
a processor that executes the instructions stored in the memory to perform:
determining a forward travel section that is a travel section having a different road gradient from a current travel section in which a vehicle is currently traveling and that is ahead in a travel direction of the vehicle;
selecting a forward gear stage which is a gear stage of the vehicle in the forward travel section;
determining whether or not the selected forward gear stage is lower by two or more stages than a current gear stage which is a gear stage of the vehicle in a current travel state of the vehicle;
in a case where the selected forward gear stage is determined to be lower by two or more stages than the current gear stage and when the vehicle is positioned within a predetermined range with respect to a start position of the forward travel section, performing downshift from the current gear stage to the forward gear stage; and
in a case where the selected forward gear stage is determined to be lower by one or less stages than the current gear stage, not performing downshift from the current gear stage to the forward gear stage.
2. The vehicle control device according to claim 1, wherein the processor configured to calculate a stall amount of the vehicle from a start point of the forward travel section to an end point of the forward travel section of the vehicle, and to control shift of the gear stage so as to prevent the downshift from the current gear stage to the forward gear stage and to maintain the current gear stage even when the vehicle is positioned within the predetermined range from the start position of the forward travel section in a case where the calculated stall amount is smaller than a predetermined value.
3. The vehicle control device according to claim 2, wherein, in a case where the calculated stall amount is determined to be equal to or larger than the predetermined value, the processor determines whether or not the forward gear stage is lower by two or more stages than the current gear stage.

4. The vehicle control device according to claim 1, wherein the processor is configured to perform the downshift from the current gear stage to the selected forward gear stage in the case where the forward gear stage is lower by two or more stages than the current gear stage and when the vehicle is positioned within the predetermined range from the start position to a predetermined position behind the start position.

5. The vehicle control device according to claim 4, wherein the processor is configured to change a timing of performing the downshift from the current gear stage to the forward gear stage based on the road gradient of the forward travel section.

6. The vehicle control device according to claim 1, wherein, in a case where the forward gear stage is determined to be lower by two or more stages than the current gear stage, the processor determines whether or not the vehicle is positioned within the predetermined range with respect to the start position of the forward travel section.

* * * * *